United States Patent [19]

Umeda et al.

[11] Patent Number: 4,941,732
[45] Date of Patent: Jul. 17, 1990

[54] TRANSMISSION TYPE PROJECTION SCREEN

[75] Inventors: Osamu Umeda, Gifu; Tohru Nakakusu, Hoya; Makoto Sato, Fussa; Tatsuo Shimazaki, Tokyo, all of Japan

[73] Assignee: Casio Computer Co., Ltd., Tokyo, Japan

[21] Appl. No.: 359,399

[22] Filed: May 31, 1989

Related U.S. Application Data

[63] Continuation-in-part of Ser. No. 79,883, Jul. 30, 1987, Pat. No. 4,875,064.

[30] Foreign Application Priority Data

Aug. 6, 1986 [JP] Japan .............................. 61-119814[U]
Mar. 28, 1987 [JP] Japan .............................. 62-46179[U]
Jul. 3, 1987 [JP] Japan .............................. 62-101814[U]

[51] Int. Cl.⁵ .............................................. G03B 21/60
[52] U.S. Cl. ........................................ 350/128; 353/78
[58] Field of Search ............................. 350/127–129, 350/336, 331 R; 353/30, 84, 122, 57, 78

[56] References Cited

U.S. PATENT DOCUMENTS

| | | | |
|---|---|---|---|
| 3,895,866 | 7/1975 | de Quervain | 353/30 |
| 3,944,331 | 3/1976 | Janning | 350/160 LC |
| 4,222,641 | 9/1980 | Stolov | 353/84 |
| 4,468,092 | 8/1984 | Inoue et al. | 350/128 |
| 4,722,593 | 2/1988 | Shimazaki | 350/536 |
| 4,770,525 | 9/1988 | Umeda et al. | 353/122 |
| 4,787,737 | 11/1988 | Ogawa et al. | 353/57 |
| 4,824,210 | 4/1989 | Shimazaki | 350/331 R |

FOREIGN PATENT DOCUMENTS

3142664 5/1983 Fed. Rep. of Germany.
3323875 3/1985 Fed. Rep. of Germany.
1569680 6/1980 United Kingdom.

*Primary Examiner*—Richard A. Wintercorn
*Attorney, Agent, or Firm*—Frishauf, Holtz, Goodman & Woodward

[57] ABSTRACT

A back-surface projection screen for observing a light image, projected from the rear surface of a screen, on a major surface of the screen comprises a lenticular lens constructed of a greater number of lens units in a continuous array with a top surface section defined as a lens section and with a pair of total-reflection surfaces formed as side convex lenses relative to a central convex lens section formed at the lens section. A pair of linear surfaces are formed one at each of the total-reflection surfaces in an opposed relation with the central lens section located therebetween. The total-reflection surfaces are so curved as to allow light which is incident on the screen from behind to be condensed by reflection toward the linear surfaces. The lens section of each lens unit in the lenticular lens is recessed at the central section to define that center convex lens surface there with the pair of side total-reflection surfaces formed as a pair of convex lens. A pair of stepped sections are formed one at a boundary between the central lens section and the side lens section to define the pair of linear surfaces. The total-reflection surfaces are so curved as to allow light which is incident on the screen from behind to be condensed by reflection toward the linear surfaces.

16 Claims, 16 Drawing Sheets

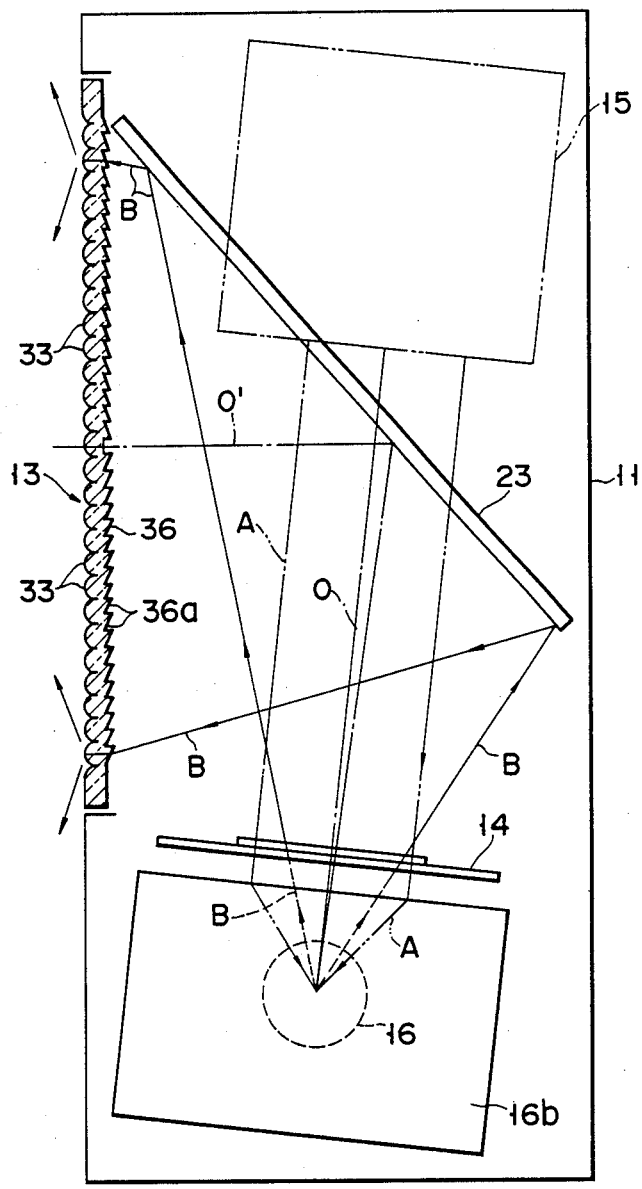
F I G. 6

ANGLE θ THAT EMERGING LIGHT OPTICAL PATH MAKES
RELATIVE TO THE PERPENDICULAR DIRECTION OF A SCREEN

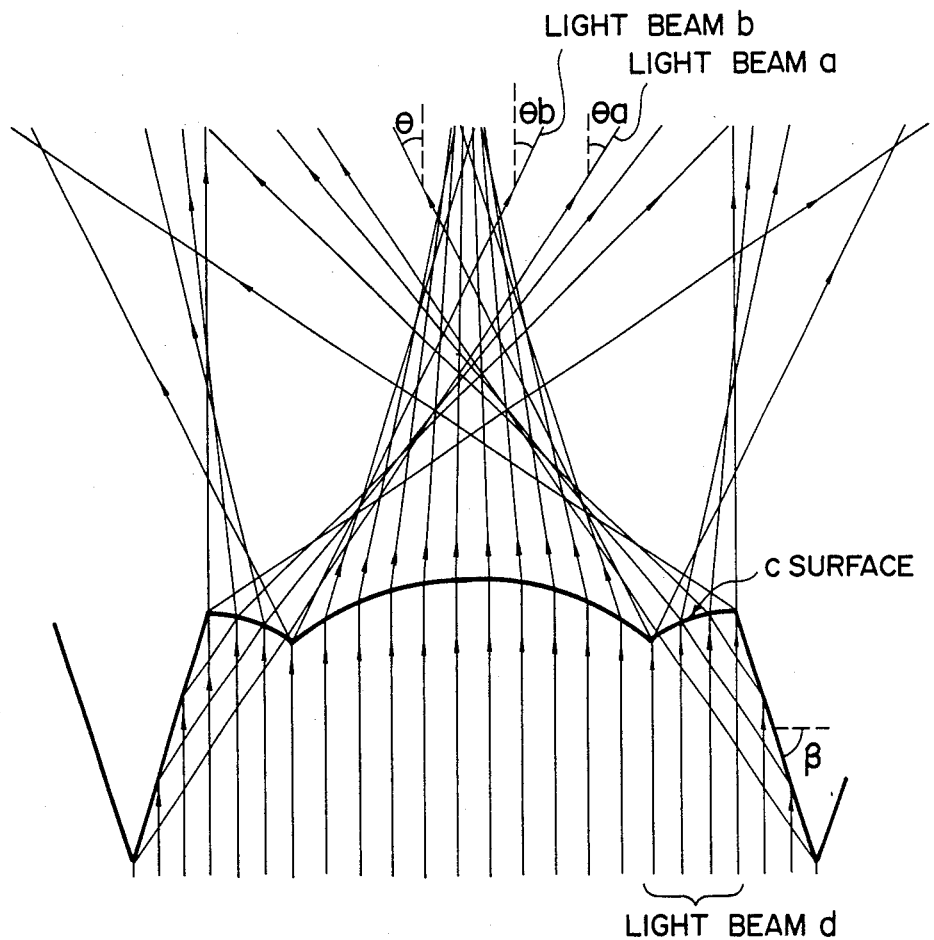
F I G. 11

TRANSMISSION TYPE PROJECTION SCREEN

Cross-Reference to Related Application

This application is a continuation-in-part application of Ser. No. 079,883, filed on July 30, 1987 for Umeda et al., now U.S. Pat. No. 4,875,064, issued Oct. 17, 1989.

BACKGROUND OF THE INVENTION

1. Field of the Invention

The present invention relates to a projection screen for displaying a light image which is projected from, for example, a projector apparatus.

2. Description of the Related Art

A projector apparatus of this type for enlarging and projecting an image displayed on a cathode-ray tube (CRT), is known. However, such a projector apparatus requires the use of a high-luminance CRT, resulting in a very expensive and bulky apparatus.

A projector apparatus may be conceived which employs a liquid crystal display panel in place of a CRT type.

This type of projector commands the displaying of an image on a transmission type liquid crystal display, then enlarges and projects the displayed image onto a screen. Projectors falling under this category include a type which projects an image onto a separate external screen and a type which projects an image onto a transmission type screen situated within the projector body.

FIG. 1 shows a conventional LCD-type projector for projecting an image onto a transmission type screen situated within the projector body. In FIG. 1, reference numeral 1 denotes the outer case of the projector. Display window 2 having transmission type screen 3 is located on the front surface of case 1. Reference numeral 4 denotes a transmission type liquid crystal display panel arranged to face screen 3 inside case 1. Reference numeral 5 denotes a light source for illuminating panel 4 from behind. Reference numeral 6 denotes a projection lens for enlarging and projecting an image displayed on panel 4 onto screen 3. Projection lens 6 is made up of a plurality of optical lenses. Light source 5 comprises high-luminance light source lamp 5a, and reflector 5b (a reflector having a parabolic reflection surface, for reflecting light from light source lamp 5a as parallel light) for reflecting illumination light from lamp 5a toward panel 4. An ultraviolet component is removed from the light emitted from light source 5 by ultraviolet absorption filter 7a and ultraviolet reflection filter 7b. The filtered light is then incident on panel 4, through condenser lens 8. Condenser lens 8 corrects the light incident on panel 4, so that it is aligned parallel to optical axis O. When reflector 5b of light source 5 is a parabolic reflector, the light beams emitted from light source propagate toward panel 4, while at the same time being slightly diffused. Therefore, the light beams are corrected to be parallel beams by condenser lens 8, so that illumination light which is parallel to optical axis 0 can be incident on panel 4. Panel 4 comprises a dot-matrix display panel for displaying, for example, a television image. Optical image passing through panel 4, i.e., a display image on panel 4, is focused on projection lens 6 by circular Fresnel lens 9, and is enlarged and projected onto screen 3 of display window 2 by projection lens 6. FIG. 1 shows an LCD-type projector using a parabolic reflector as reflector 5b of light source 5. In a liquid crystal projector using an elliptic mirror surface reflector as the reflector, a relay lens is arranged between the light source and the liquid crystal display panel, so that light reflected by the reflector is corrected by the relay lens to be parallel light and is guided to the liquid crystal display panel.

In this liquid crystal projector, the display image on panel 4 is enlarged and projected onto screen 3 on the front surface of the projector body, and is watched from the front surface side of the projector body. With this projector, the display image on a small liquid crystal display panel can be enlarged and watched. In this liquid crystal projector, since screen 3 is provided to the projector body, the projection screen does not have a large size relative to a liquid crystal projector for projecting an image onto an external screen. However, since the external screen is not necessary, the above projector shown in FIG. 1 can be used in any location.

The screen 3 is of a transmission type and is used as a rear-surface projection screen for a projection apparatus, such as a rear-surface projection type projector, which enables a light image which is projected from behind the screen to be observed on the major surface of the screen. This type of screen is formed of a lenticular lens having a greater number of lens units in a continuous array on an observation surface, that is, a major surface of the screen.

The rear-surface projection screen having the lenticular lens allows light which is incident on the rear surface of the screen to emerge on the major surface of the screen in a diffused fashion. Such a screen has the advantage of providing a projection image at a greater field of vision than a planar screen.

Known is a screen constructed of a lenticular lens having lens units formed in a continuous array on the major surface with a top surface formed as a lens surface and with a pair of side-inclined surfaces formed, as a pair of total-reflection surfaces relative to the top surface to allow light which is incident on the rear surface of the screen to be directed to the lens surface. Since the conventional rear-surface projection screen has a pair of straight-inclined surfaces as the side-inclined surfaces at each of the lens units over the whole surface of the lenticular lens, it follows that, of light which is reflected by the total-reflection surface toward the lens surface of the lens unit, some which is incident on the lens surface at a near total-reflection angle is reflected back from the lens surface in the rear-surface direction of the screen. As a result, there occurs a great loss of light so that the image screen appears dark.

SUMMARY OF THE INVENTION

It is accordingly the object of the present invention to provide a back-surface projection screen which enables an image surface to appear bright on the rear-surface projection screen by allowing light which emerges from a major surface of the screen after it has been incident on the screen surface from behind the screen to be diffused at a greater angle of vision by means of a lenticular lens on the surface of the screen and allowing light which is reflected from a pair of total-reflection surfaces of each lens unit of the lenticular lens toward the lens section to be transmitted through the screen without being lost and appear on the major surface.

According to the present invention, there is provided a back-surface projection screen for observing a light image, projecting from the rear surface of a screen, on a front surface, comprising a lenticular lens constructed of a great number of lens units in a continuous array with a top surface section defined as a lens section and with a total-reflection surface formed at each side of the lens section, in which, with respect to a central area of the lens section of each lens unit, linear surfaces are provided in an opposed relation at the total-reflection surfaces of each lens unit.

BRIEF DESCRIPTION OF THE DRAWINGS

FIG. 6 is a schematic view showing an optical path in FIG. 5;

FIG. 11 is a view showing a state in which light emerges from a lenticular lens at an angle of below 37° relative to a plane perpendicular to an optical axis of light which is incident in a direction perpendicular to the screen;

DETAILED DESCRIPTION OF THE PREFERRED EMBODIMENT

An embodiment of the present invention will be described hereinafter with reference to the accompanying drawings.

Figure 3:
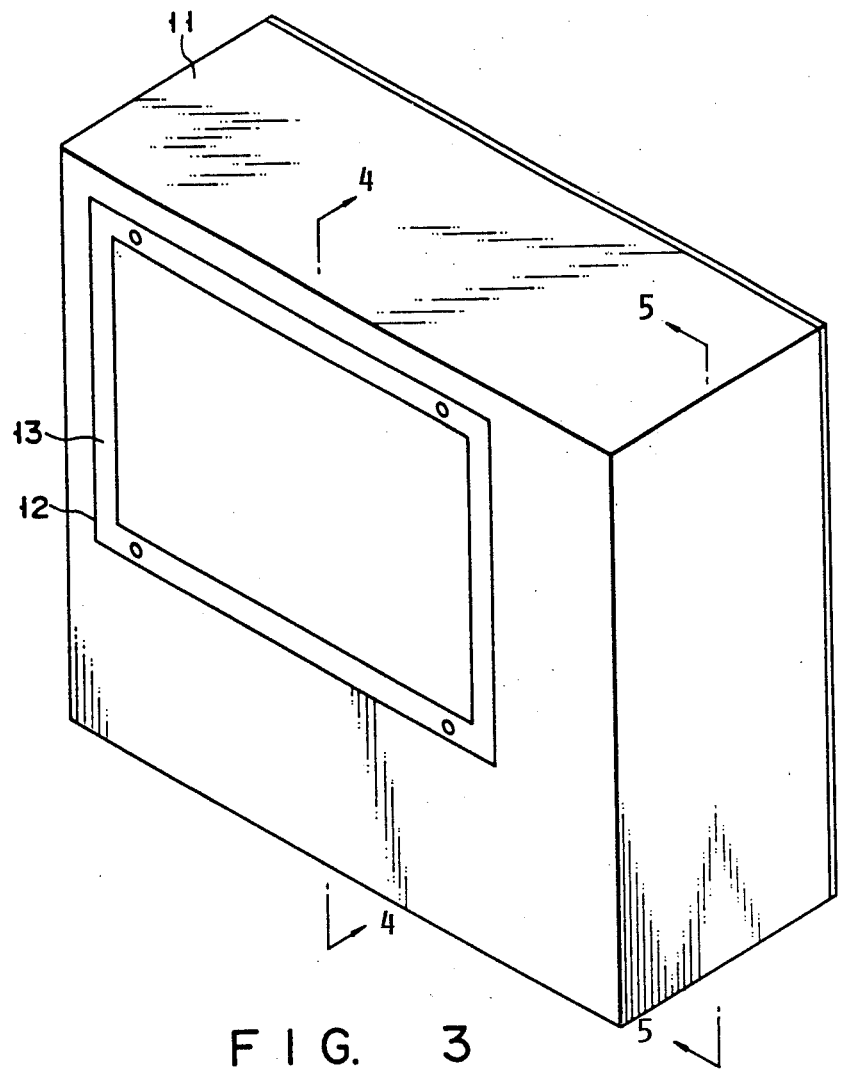
FIG. 3 is a view showing an outer appearance of the projector shown in FIG. 2.

FIG. 3 is an outer appearance showing a liquid crystal projector apparatus equipped with a screen of the present invention. Projector case 11 has a rectangular box-like shape having a height of about 23 cm, a width of about 25 cm, and a depth of about 10 cm. 8" display window 12 comprising transmission type screen 13 is provided to the upper left portion of the front surface of case 11.

Figure 1:
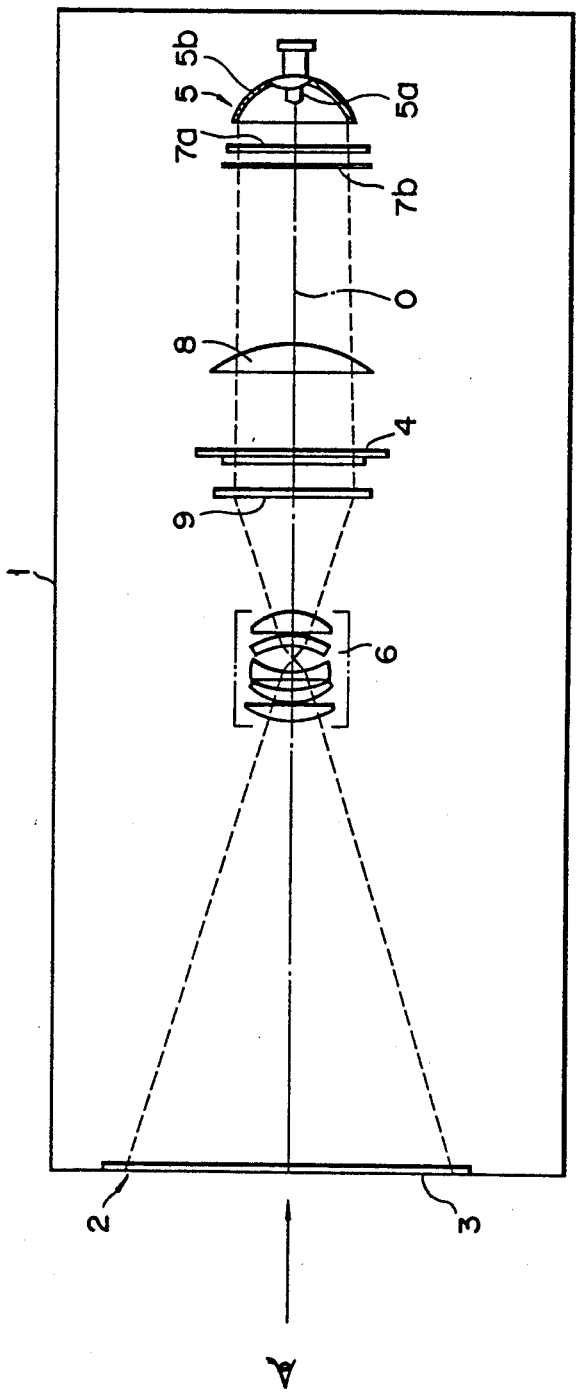
FIG. 1 is a view showing a prior art liquid crystal projector.
Figure 2:
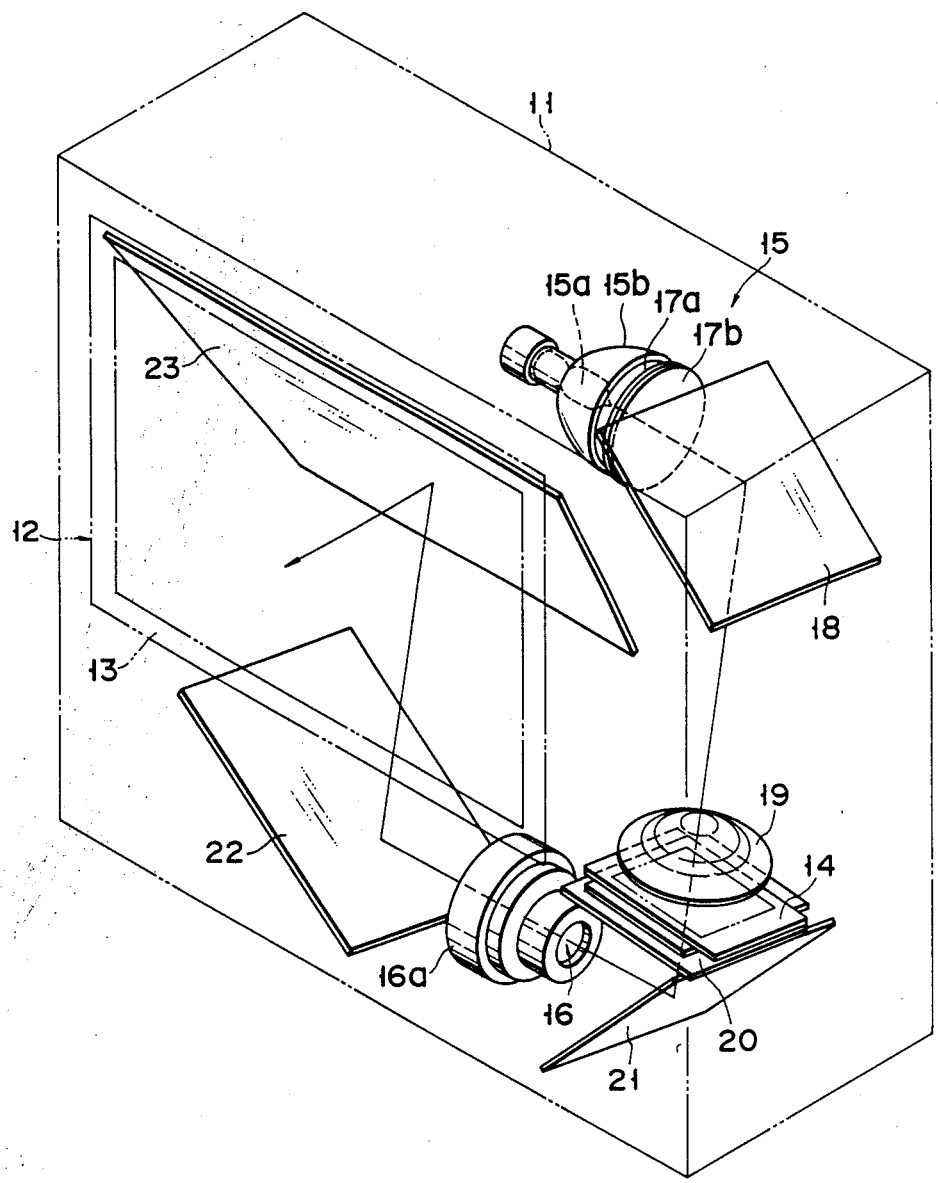
FIG. 2 is a perspective view showing an internal arrangement of a projector apparatus according to an embodiment of the present invention.
Figure 4:
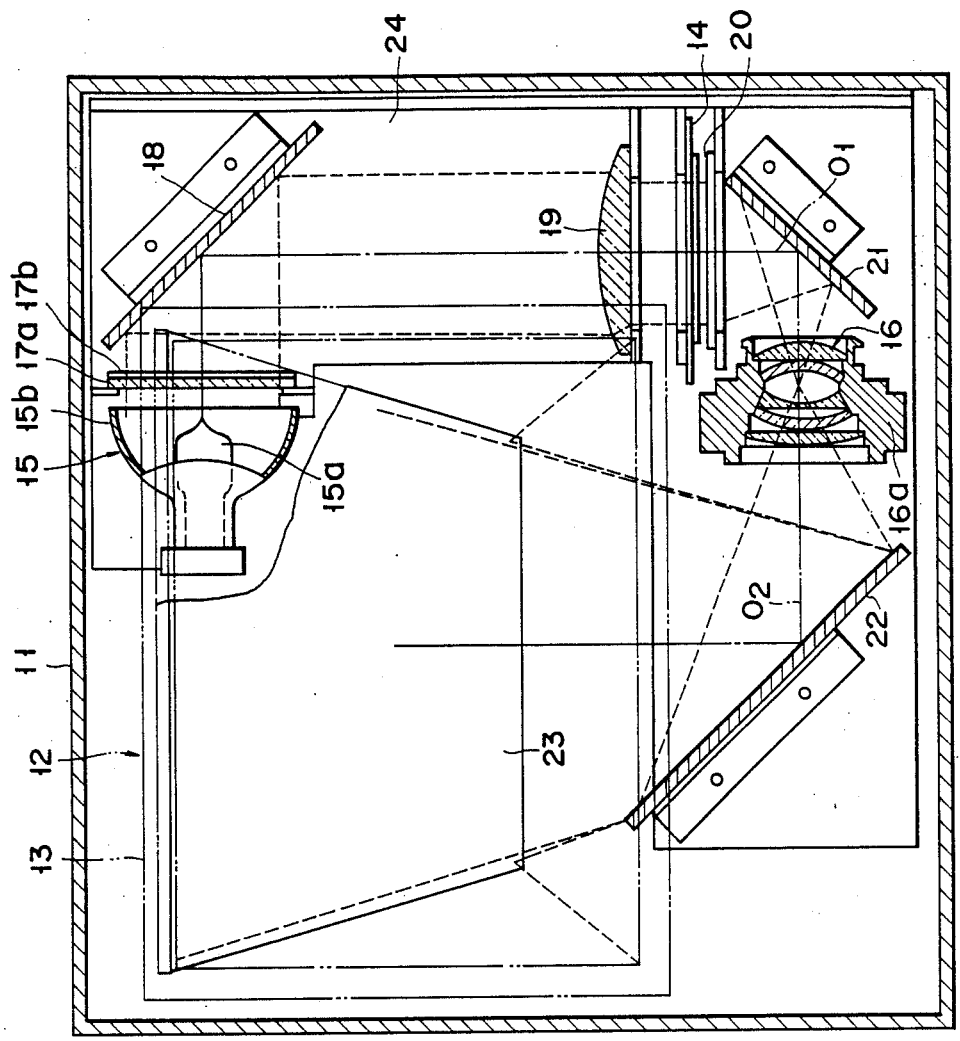
FIG. 4 is an enlarged sectional view taken along a line A—A in FIG. 3.
Figure 5:
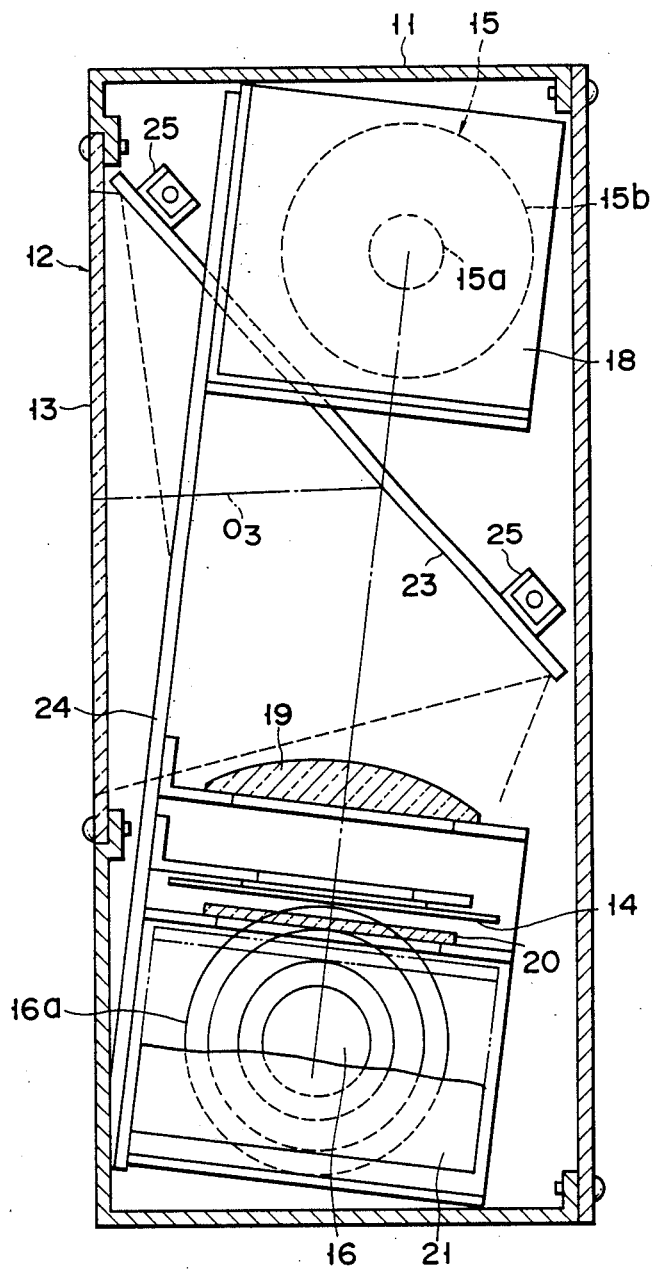
FIG. 5 is an enlarged sectional view taken along a line B—B in FIG. 3.

The internal arrangement of the liquid crystal projector will be described below. Referring to FIGS. 2, 4, and 5, reference numeral 14 denotes a transmission type dot-matrix liquid crystal display panel for displaying, e.g., a television image; 15, a light source for illuminating panel 14 from its back surface side; and 16, a projection lens for enlarging and projecting a display image on panel 14 onto screen 13 of window 12. Panel 14 is arranged in a horizontal state to face its panel surface (display surface) downward in a lower space inside case 11 on the right side of display window 12. Note that panel 14 has a 2" display screen.

Light source 15 comprises high-luminance light source lamp 15a such as a Xenon lamp, and reflector 15b for reflecting the light emitted from lamp 15a toward panel 14. In this embodiment, a parabolic reflector having a parabolic reflection surface for reflecting the light from lamp 15a to be parallel beams is adopted as reflector 15b. Light source 15 is arranged in an upper portion inside case 11 so that an open surface of reflector 15b faces the right side wall surface of case 11. An ultraviolet component is removed from light emitted from light source 15 by ultraviolet absorption filter 17a and ultraviolet reflection filter 17b. The light is reflected downward by illumination light reflection mirror 18 arranged in the obliquely upper right portion inside case 11, and is then corrected to be parallel beams parallel to optical axis O1 of panel 14 by condenser lens 19 arranged above panel 14. Then, the parallel beams are incident on panel 14 from its back surface side (upper surface side). In this embodiment, as reflection mirror 18, a cold mirror for absorbing an ultraviolet component and reflecting only visible light is adopted.

Projection lens 16 is constituted by a plurality of optical lenses arranged in lens barrel 16a. Projection lens 16 is laterally arranged in a space below display window 12 inside case 11 so that lens optical axis O2 is directed toward the right-and-left direction of case 11. Circular Fresnel lens 20 for focusing transmission light, i.e., a display image to projection lens 16 is arranged below panel 14 to be parallel thereto, and display image reflection mirror 21 for reflecting the display image toward projection lens 16 is obliquely arranged therebelow. The display image passing through Fresnel lens 20 is reflected by display image reflection mirror 21 and is guided toward projection lens 16.

Reference numerals 22 and 23 denote two projection mirrors for reflecting the projection image passing through projection lens 16 toward screen 13 of window 12. First projection mirror 22 is obliquely arranged to reflect upward the projection image passing through projection lens 16. Second projection mirror 23 is inclined obliquely downward such that its reflection optical axis coincides with projection optical axis O3 toward screen 13 so as to reflect the projection image reflected by projection mirror 22 toward screen 13.

Light source 15, filters 17a and 17b, reflection mirror 18, condenser lens 20, reflection mirror 21, projection lens 16, and first projection mirror 22 are mounted on optical system support frame 24 which is arranged inside case 11 such that its upper end portion is slightly inclined toward the rear portion of the case. Second projection mirror 23 is mounted on mirror support member 25 arranged inside case 11, so as to separate display window 12 on the front surface of case 11 from light source 15.

More specifically, in this liquid crystal projector, projection lens 16 for enlarging and projecting a display image on panel 14 onto screen 13 provided to display window 12 of the front surface of case 11 is arranged such that its optical axis O2 is directed in a direction perpendicular to optical axis O3 toward screen 13. Two projection mirrors 22 and 23 for reflecting a projection image passing through projection lens 16 are arranged between projection lens 16 and screen 13. Panel 14 is arranged such that its optical axis O1 is directed in a direction perpendicular to optical axis O2 of projection lens 16. Display image reflection mirror 21 for reflecting the display image on panel 14 toward projection lens 16 is arranged between panel 14 and projection lens 16, so that the display image on panel 14 is reflected by mirror 21 and is then guided toward lens 16. The projection image passing through lens 16 is reflected by mirrors 22 and 23 and is projected onto screen 13. In this liquid crystal projector, lens 16 is arranged such that its optical axis O2 is directed in a direction perpendicular to projection optical axis O3 toward screen 13 and panel 14 is arranged such that its optical axis O1 is directed in a direction perpendicular to optical axis O2 of lens 16. Therefore, the entire projector can be rendered compact as compared to a conventional liquid crystal projector in which the liquid crystal display panel and the projection lens are arranged linearly with respect to the screen.

In this projector, since the projection image passing through projection lens 16 is reflected by projection mirrors 22 and 23 and guided toward screen 13, an optical path from lens 16 to screen 13 can be sufficiently long. Therefore, the display screen of panel 14 can be sufficiently enlarged (in this embodiment, the 2" screen is enlarged to an 8" screen). In this embodiment, panel 14 is arranged in the lower portion inside case 11, and light source 15 is arranged in the upper portion inside case 11. Therefore, a distance from light source 15 to panel 14 can be sufficiently long. In addition, since light source 15 is arranged behind second projection mirror 23, heat radiated from light source 15 can be shielded by mirror 23. Therefore, panel 14 which is easily influenced by heat can be projected from heat generation of light source 15, and hence, thermal destruction of panel 14 can be avoided.

In the above embodiment, light source 15 is laterally arranged in the upper portion inside case 11, and light emitted from light source 15 is reflected by reflection mirror 18 toward panel 14. Light source 15 may be arranged to face downward opposite to panel 14 at a position of mirror 18. In the above embodiment, projection image passing through lens 16 is reflected by two projection mirrors 22 and 23 and guided toward screen 13. However, only second projection mirror 23 may be arranged. In this case, projection lens 16 is arranged to face second projection mirror 23, so that light can be guided toward projection lens 16 by reflection mirror 21 therebelow and another mirror (arranged in the same manner as first projection mirror 22).

Transmission type screen 13 will be described in detail. FIG. 6 schematically shows an optical path in FIG. 5. More specifically, light source 15 emits light beams A parallel to input optical axis O onto liquid crystal display panel 14. Light transmitted through panel 14, i.e., image light B is enlarged and projected onto back-surface projection screen 13 through projection mirror 23 by projection section 16b. Projection section 16b comprises display image reflection mirror 21 for horizontally reflecting image light B from the above which is transmitted through panel 14, projection lens 16 for enlarging and projecting light reflected by reflection mirror 21, and projection mirror 22 for reflecting image light B passing through lens 16 toward projection mirror 23. Image light B reflected by mirror 22 is reflected and projected by projection mirror 23 toward screen 13.

Figure 7:
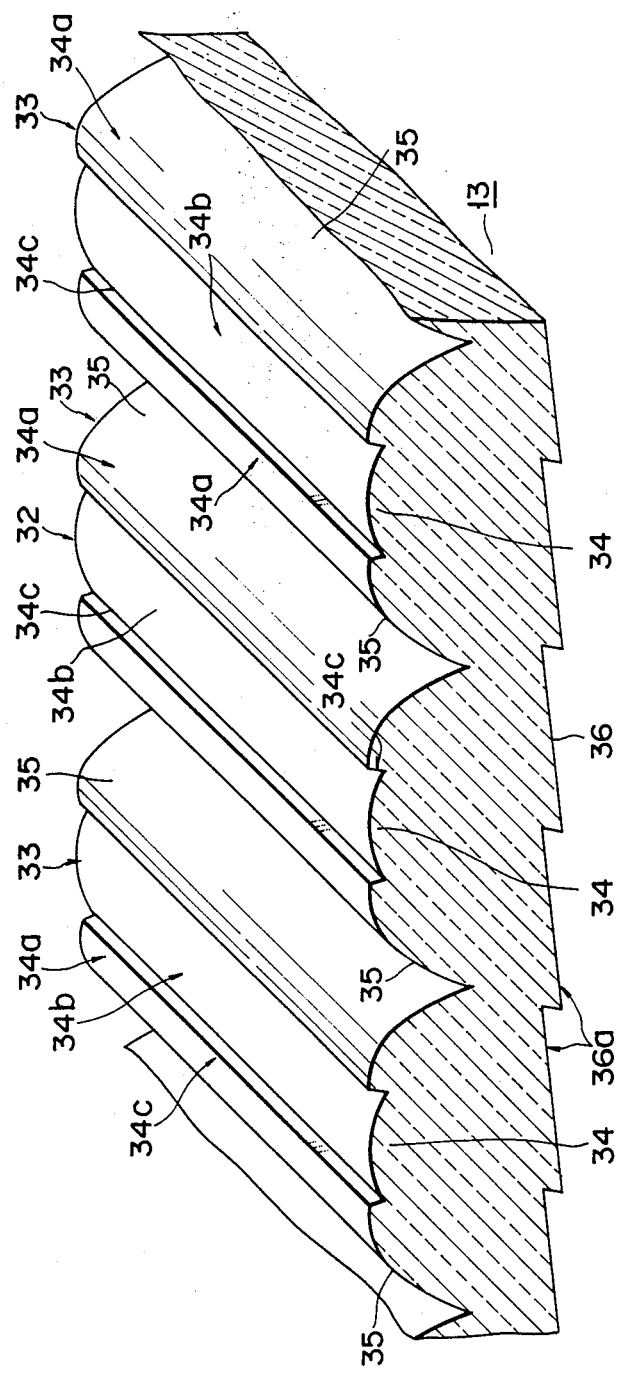
FIG. 7 is a perspective view partially showing a transmission screen.
Figure 8:
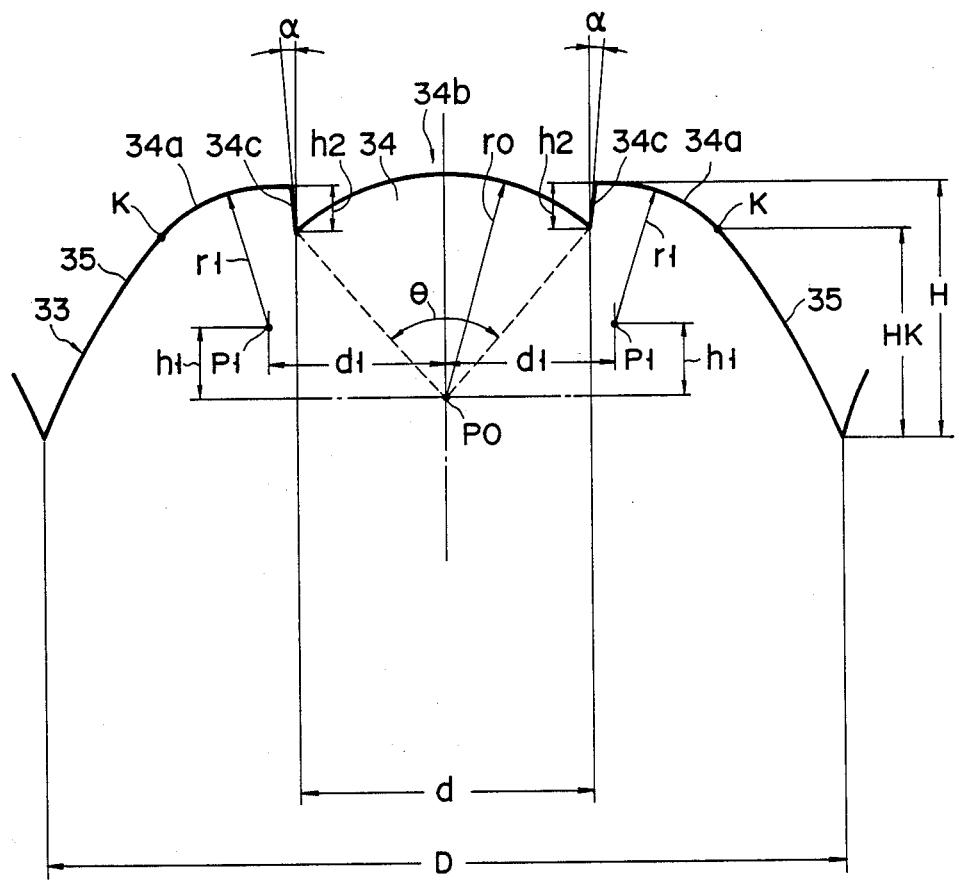
FIG. 8 is a sectional view showing a shape of a single lens FIG. 7.

Transmission type screen 13 will be described below. FIG. 7 partially shows screen 13. FIG. 8 is an enlarged view of a single lens unit of the screen. Referring to FIGS. 7 and 8, screen 13 is formed of a transparent resin sheet such as an acrylic resin. Lenticular lens 32 is integrally formed on the entire front surface, i.e., observation surface of screen 13, and incident light correction Fresnel lens 36 is formed on the entire back surface, i.e., light incident surface thereof. Note that screen 13 is manufactured by hot press of a resin sheet, or impression or injection molding of a transparent resin.

Lenticular lens 32 is constituted by a large number of parallel linear lens units 33 having a very small width. Each lens unit 33 has width D (a maximum width of base portion) of 0.888 mm and height H of 0.288 mm. The top portion of each lens unit 33 serves as lens portion 34, and two side surfaces thereof serve as total reflection surfaces 35. Two side portions of lens portion 34 at the top portion serve as convex lens surfaces 34a, and the central portion is recessed, so that the recessed surface serves as convex lens surface 34b. Stepped portions between central convex lens surface 34b and convex lens surfaces 34a have linear surfaces 34c facing total reflection surfaces 35 on the two sides of lens unit 33. Central convex lens surface 34b is formed into a spherical lens having radius of curvature r0 of 0.25 mm. Width d of convex lens surface 34b is defined such that spread angle $\theta$ from center of curvature P0 of convex lens surface 34 does not exceed 42 degrees. The reason why spread angle $\theta$ of convex lens surface 34b is defined to fall within 42 degrees is as follows. If spread angle $\theta$ exceeds 42 degrees, inclination angles at two sides of convex lens surface 34b (of portions at which spread angle $\theta$ exceeds 42 degrees) reach total reflection angles and cannot allow incident light to transmit therethrough. In this embodiment, spread angle $\theta$ is determined to be a maximum angle ($\theta = 42$ degrees) within which no total reflection surface against incident light cannot be formed. Note that width d of convex lens surface 34b is 0.38 mm. Convex lens surfaces 34a at two sides are formed into spherical lenses each having radius of curvature r1 of 0.165 mm. Center of curvature P1 of each convex lens surface 34a is shifted from center of curvature P0 of convex lens surface 34b in a direction along the screen surface (horizontal direction in FIG. 8) by distance d1 of 0.19 mm and is shifted from center of curvature P0 in a screen surface direction (vertical horizontal direction in FIG. 8) by distance h 1 of 0.082 mm. Furthermore, linear surfaces 34c formed on the stepped portions between central convex lens surface 34b and convex lens surfaces 34a at two sides thereof and facing total reflection surfaces 35 are very small-wide surfaces each having leading height h2 of 0.057 mm. Linear surfaces 34c are substantially perpendicular to the screen surfaces. It is difficult to form linear surfaces 34c as perfect vertical surfaces in association with releasing after screen molding. In this embodiment, linear surfaces 34c each have small inclination angle $\alpha$ of about 3 degrees. Each total reflection surface 35 is formed into a parabolic surface for reflecting and focusing light incident from the back surface side of the screen toward linear surfaces 34c at the center of lens portion 34. The parabolic surface is defined such that its focal point is formed on linear surfaces 34c or a portion adjacent thereto (in this embodiment, a parabolic surface having a quadratic coefficient of $-5$). Note that in FIG. 8, k indicates boundary points between convex lens surfaces 34a and total reflection surfaces 35. Height Hk of total reflection surface 35 is 0.247 mm.

Incident light correction Fresnel lens 36 formed on the back surface of screen body 31a corrects light (image light) B projected onto screen 13 while being diffused, into parallel beams perpendicular to the screen surface. Fresnel lens 36 comprises a circular Fresnel lens in which a large number of annular lens portions 36a are concentrically formed about optical axis O' of screen projection light B, as shown in FIGS. 7 and 8. Note that a width of each lens portion 36a of Fresnel lens 36 is 0.54 mm.

Figure 9:
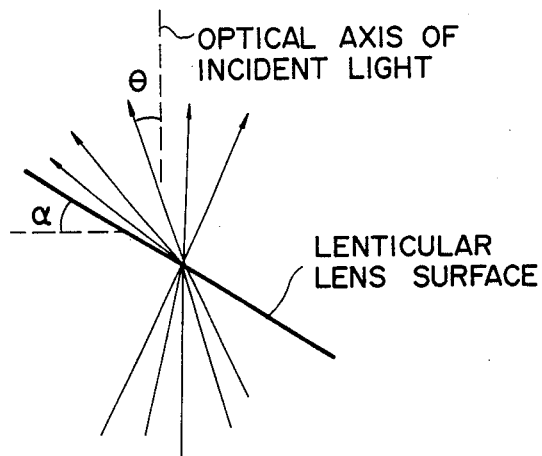
FIG. 9 is a view showing various angles at which light emerges after it has been incident on a screen.

When a lenticular lens having a greater number of lens units formed in a continuous array is used for a transmission type screen, light beams emerge at varying angles even if they are incident perpendicularly to the screen. As shown in FIG. 9, the surface of the lenticular lens is inclined at an angle of $\alpha$ relative to an optical axis of light which is incident perpendicularly to the screen and the light emerges at varying angles due to the angle of $\alpha$, so that the emerging light varies in its strength characteristic.

Figure 10:
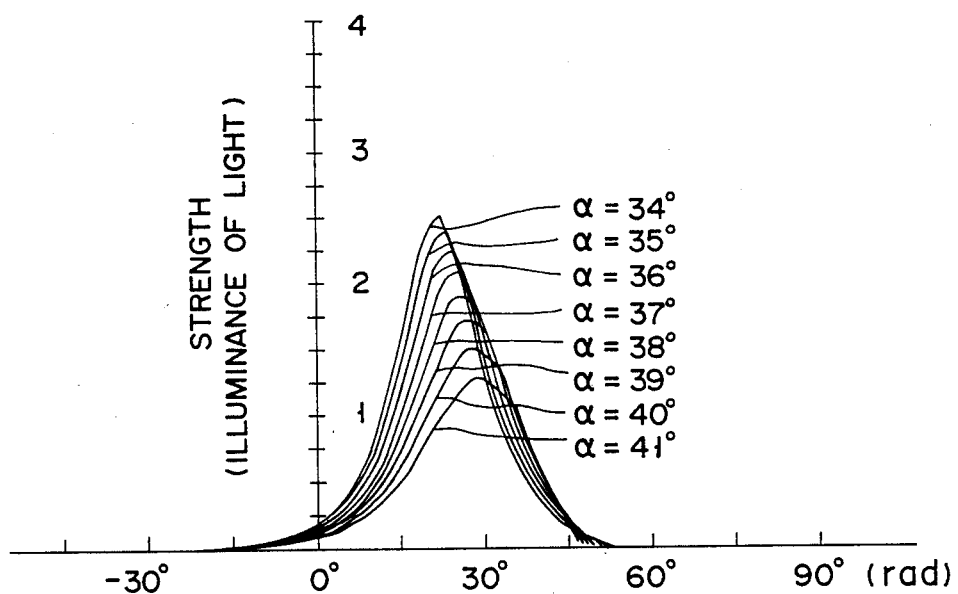
FIG. 10 is a graph showing a relation of the vertical direction of a screen and an optical axis of emerging light to an angle $\alpha$.

FIG. 10 shows a relation between the angle $\alpha$ and the angle $\theta$ which an optical axis of emerging light makes relative to the perpendicular direction of the screen. From FIG. 10 above it will be appreciated that, at an angle $\alpha$ greater than 37°, the strength (the brightness) of the light becomes smaller even if the angle $\theta$ is made greater so as to obtain a broader diffusion. In order to control the angle of the emerging light by refraction without using the total-reflection surface, it is better not to use any surface greater than at the angle of 37°.

In the case where the light beams are to be controlled by one refraction, a design choice is made at an angle of $\alpha \leq 37°$, resulting in a configuration as shown in FIG. 11.

Light beams are never present within a range between an angle $\theta a$ made relative to an optical axis of an incident light beam a and an angle $\theta b$ made relative to an optical axis of an incident light beam b.

That is, no light beams emerge which take an angle range between the angle $\theta b$ and the angle $\theta b$. If, in this case, the screen is observed from an angle range between angles $\theta a$ and $\theta b$, a corresponding image appears dark.

In order to eliminate such a drawback, there are two alternative solutions, one for making the angle $\beta$ which is made relative to a plane perpendicular to an optical axis of the light incident on the total-reflection surface nearer to 90° so that the aforementioned angle $\theta b$ gets nearer to the aforementioned angle $\theta a$ and one for providing an area of an angle $\alpha > 37°$ on the surface C, that is a curved surface from which the total-reflection light beams emerge, so as to make the angle $\theta b$ nearer to the angle $\theta a$.

If the angle $\beta$ is made nearer to 90°, the total-reflection surface is very difficult to manufacture. Furthermore, if the area of the angle $\alpha > 37°$ is provided on the surface C (curved surface), then the light beams d directly incident on the surface C emerge with a loss of light resulting from the total reflection of the surface C.

Figure 12:
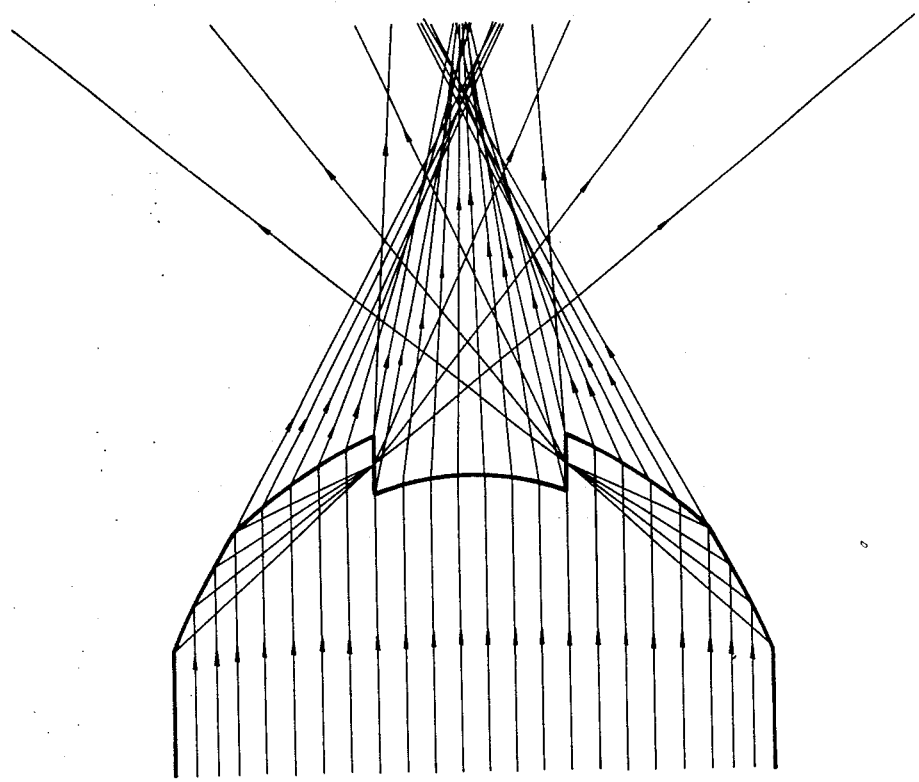
FIG. 12 is a view showing a state of emergent light when a curved surface C of FIG. 11 is a linear surface.

If, on the other hand, as shown in FIG. 12, the surface C (FIG. 10) is formed as a linear surface parallel to the optical axis of light incident on the screen, then it involves no loss of light and, moreover, it is possible to obtain a uniform, broad luminance distribution. As a result, a screen image appears brighter (not dark) on the screen when viewed from every angle.

According to the present invention, a transmission type screen is molded integral with a lenticular lens and Fresnel lens in which the lenticular lens is constituted by a number of lens units formed in a continuous array on the major surface of the screen and the Fresnel lens is formed on the rear surface of the screen, each lens unit having a central lens portion serving as a convex lens and total-reflection surfaces formed relative to the central lens portion to define linear surfaces at both sides of the central lens portion of the respective lens unit. In such a transmission type screen, the incident light is reflected on the total-reflection surfaces of the lens unit and, after being passed through the linear surfaces, obliquely emerge toward an outside of the diffusion light area past the front of the central lens portion (the convex lens surface).

Figure 13:
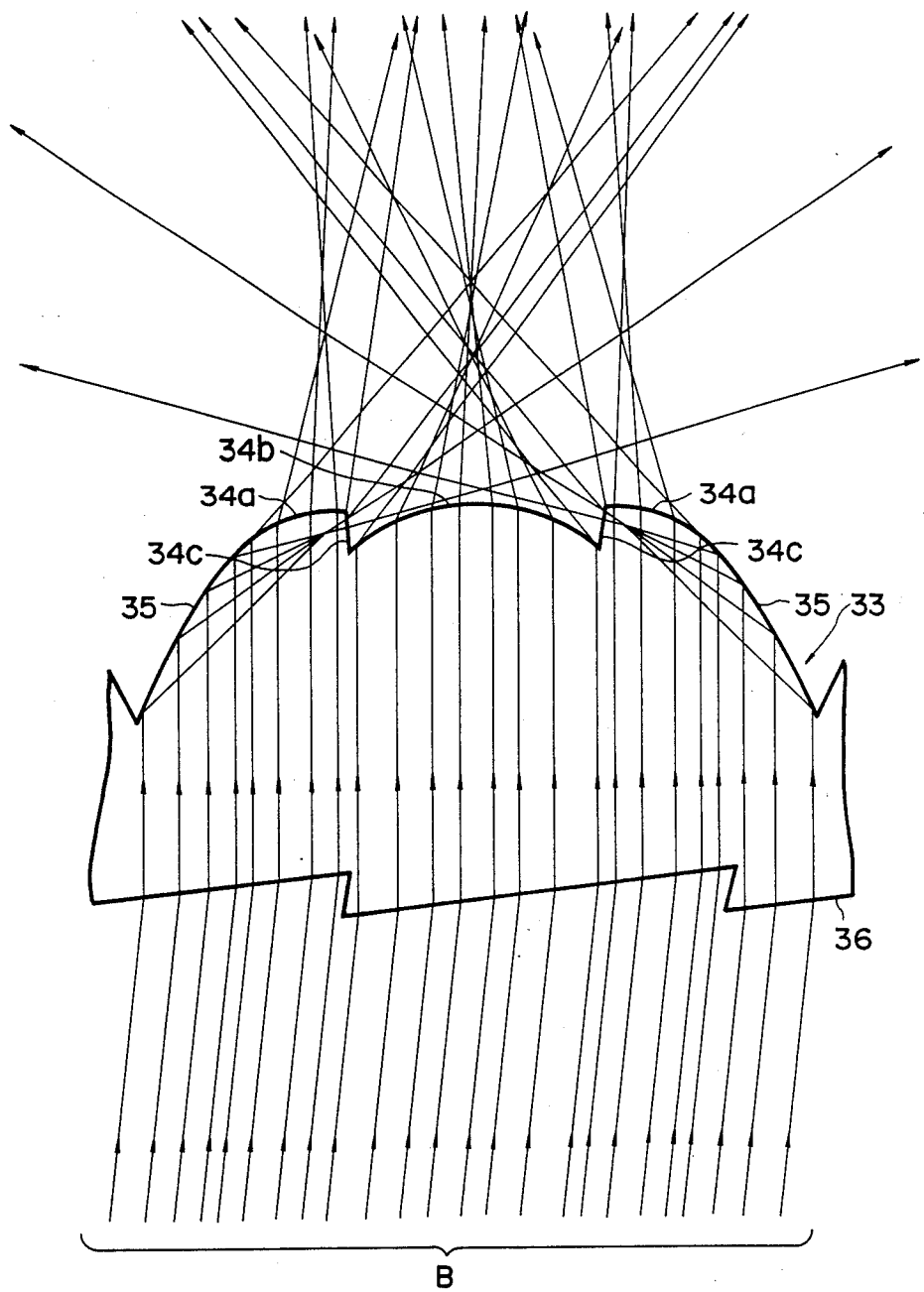
FIG. 13 is a view showing a light diffusing state of the single lens unit in FIG. 7.

FIG. 13 shows a light diffusing state of single lens unit 33 of lenticular lens 32 on the screen. Light B projected onto the screen from its back surface side is corrected into parallel beams perpendicular to the screen surface by Fresnel lens 36 and the parallel beams are incident on the screen. Among light components passing through lens unit 33 of lenticular lens 32 and emerged toward the screen surface side, light directly transmitted through lens portion 34 at the top portion of the lens unit is refracted and diffused by central convex lens surface 34b and convex lens surfaces 34a of lens portion 34, as shown in FIG. 13. The parallel beams incident on parabolic total reflection surfaces 35 at two sides of lens unit 33 are reflected and focused by surfaces 35 toward linear surfaces 34c, and are transmitted through linear surfaces 34c to be refracted and diffused, as shown in FIG. 13.

More specifically, in transmission type screen 13, lens portion 34 of each lens unit 33 of lenticular lens 32 for diffusing light incident on the back surface side of screen 13 and exited from the front surface side thereof has a shape such that total reflection surfaces 35 and linear surfaces 34c respectively facing total reflection surfaces 35 at two sides of the lens unit are formed at the stepped portions between convex lens surfaces 34a and surface 34b which is formed by recessing the central portion of lens portion 34. In addition, total reflection surfaces 35 at the two sides of each lens unit 33 have parabolic surfaces for reflecting and focusing incident light from the screen back surface side toward corresponding linear surfaces 34c. Therefore, all the light components reflected by total reflection surfaces 35 are emerged from linear surfaces 34c of the lens portion. Since linear surfaces 34c face total reflection surfaces 35, light components reflected by total reflection surfaces 35 and incident on linear surfaces 34c are transmitted through surfaces 34c without being reflected thereby. Therefore, with the transmission type screen, light reflected by total reflection surfaces 35 of each lens unit 33 of lenticular lens 32 toward lens portion 34 can be transmitted toward the screen surface side without loss, thereby obtaining a bright screen. Light reflected by total reflection surfaces 35 and transmitted through linear surfaces 34c are emerged obliquely toward the outside a region of diffused light transmitted through central and side convex lens surfaces 34b and 34a through a portion in front of central convex lens surface 34b. Therefore, the diffusing range of light transmitted through the screen can be widened to increase a field angle as compared to a screen which diffuses light by only a convex lens surface. Since linear surfaces 34c are slightly inclined (in this embodiment, 3 degrees) as described above, light directly incident on linear surfaces 34c from the screen back surface side is reflected toward side convex lens surfaces 34a in accordance with the inclination angle of linear surfaces 34c, and is again reflected by convex lens surfaces 34a toward the screen back surface side in accordance with the incident angle to convex lens surfaces 34a. However, since the width (leading height h2) of linear surface 34c is very small (in this embodiment, 0.057 mm), light loss due to light reflection by linear surface 34c is very small. Since all light components reflected by total reflection surfaces 35 can be transmitted toward the screen surface side from linear surfaces 34c and this effect is remarkable, light loss due to reflection of incident light at the linear surfaces 34c can be ignored.

In the above embodiment, spread angle $\theta$ from center of curvature P0 of central convex lens surface 34b is defined to be a maximum angle ($\theta = 42$ degrees) within which no total reflection surface of incident light is formed on convex lens surface 34b. Spread angle $\theta$ can be smaller than 42 degrees. In the above embodiment, side convex lens surfaces 34a and central convex lens surface 34b are formed into spherical surfaces. However, lens surfaces 34a and 34b can be aspherical surfaces. Total reflection surfaces 35 are not limited to parabolic surfaces but can be curved surfaces such as elliptic surfaces if they are curved surfaces capable of reflecting and focusing incident light from the screen back surface side toward linear surfaces 34c of lens portion 34. In the above embodiment, the screen is formed of a transparent resin such as an acrylic resin. However, the transmission type screen can be formed of a transparent resin in which light diffusion particles are mixed or on the entire surface of which a light diffusion layer is formed. In the above embodiment, incident light correction Fresnel lens 36 for correcting light projected onto the screen into parallel beams perpendicular to the screen surface is integrally formed on the back surface of the screen. The Fresnel lens can be separately arranged on the back surface side of the screen. Note that transmission type projection display apparatus includes a vertical projection type apparatus such as a transmission type liquid crystal television receiver for vertically projecting an image with respect to a screen surface, and an oblique projection type apparatus for obliquely projecting an image with respect to the screen surface. In the case of the vertical projection type projection apparatus, projection light toward the screen can be converted to parallel beams perpendicular to the screen surface by the incident light correction Fresnel lens to be incident onto the screen surface. In the case of oblique projection type apparatus, the incident light correction Fresnel lens for correcting diffused projection light into parallel beams and another Fresnel lens for converting a direction of the projection light into a direction perpendicular to the screen are arranged on the back surface of the screen (one of these Fresnel lenses may be formed integrally on the back surface of the screen), so that light emitted from a projection source can be converted to parallel beams perpendicular to the screen surface to be incident thereon.

Therefore, light reflected by the total reflection surfaces of each lens unit of the lenticular lens toward the lens portion can be transmitted toward the screen surface side without loss and a bright screen can be provided. In addition, light reflected by the total reflection surfaces and transmitted through the linear surfaces is obliquely emerged toward a region outside a region of diffused light transmitted through the central and side convex lens surfaces through a portion in front of the central convex lens surface. Therefore, a diffusion range of light transmitted through the screen can be widened to increase a field angle as compared to a structure wherein light is diffused by only a convex lens surface.

Another embodiment of transmission type screen 13 will now be described with reference to FIGS. 14 and 15.

Figure 14:
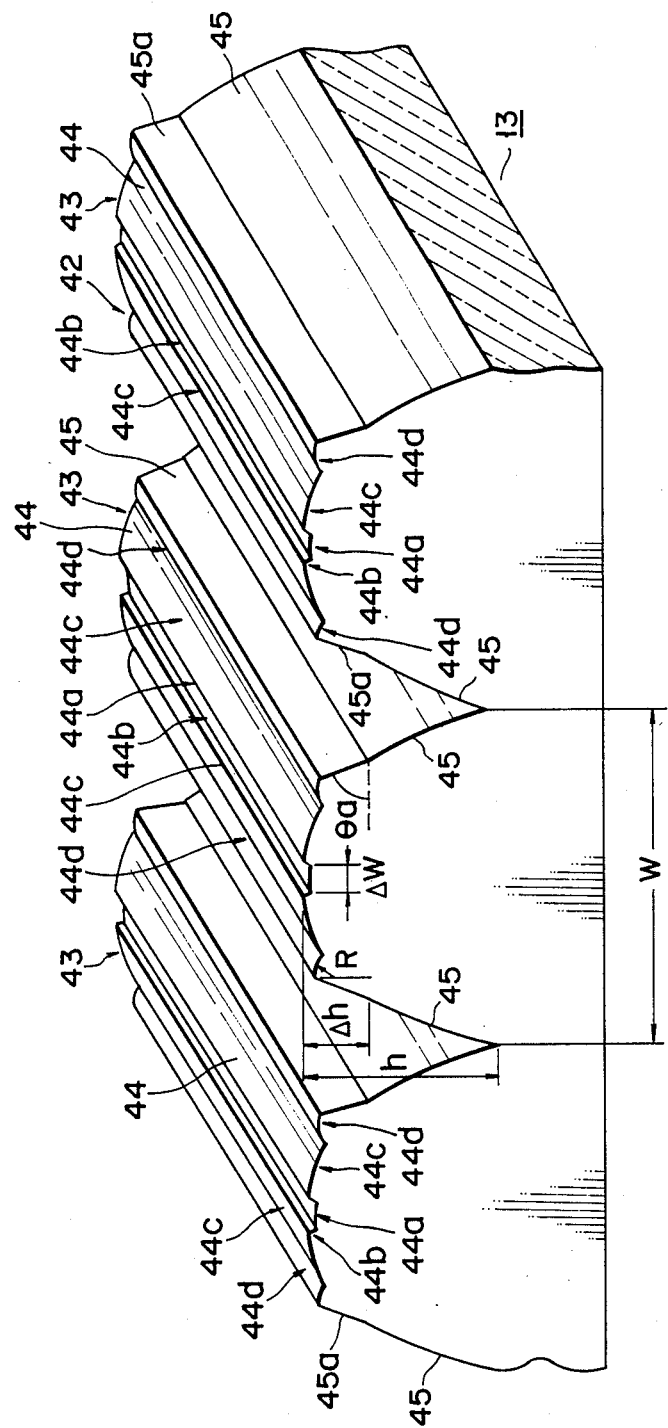
FIG. 14 is a perspective view of a transmission type screen to another embodiment of the present invention.

FIG. 14 partially shows transmission type screen 13. Transmission type screen 13 is a screen body formed of a transparent resin sheet such as an acrylic resin. Lenticular lens 42 is integrally formed on the entire surface, i.e., observation surface of screen 13. Note that the transmission type screen is formed by hot press of a resin sheet, or impression or injection molding of a transparent resin.

Lenticular lens 42 is constituted by a large number of parallel linear lens units 42 each having a very small width. Each lens unit 42 has width w (a maximum width of a base portion) of 1.2 mm, and height h of 0.675 mm. The top portion of each lens unit 43 serves as lens portion 44, and two side surfaces thereof serve as total reflection surfaces 45. The central portion of lens portion 45 at the top portion of lens unit 44 is recessed, so that the bottom surface of the recessed portion serves as convex lens surface 44a and two side surfaces thereof serve as inclined linear surfaces 44b respectively facing total reflection surfaces 45. Convex lens-like aspherical lens surfaces 44c having the center of the lens portion as their vertex are formed on the two sides of the recessed portion. Furthermore, convex lens surfaces 44d having the outer edge portions of the lens portion as their vertexes are formed on the two side edge portions of the lens portion. Note that width $\Delta w$ of convex lens surface 44a at the center of the lens portion is 0.07 mm, and a radius of curvature thereof is 0.05 mm. Aspherical lens surfaces 44c have aspherical surfaces represented by a 10th-order function, and radius of curvature R of convex lens surfaces 44d at two side edge portions is 0.1 mm.

Each of total reflection surfaces 45 at the two sides of each lens unit 43 is formed into a parabolic surface for reflecting and focusing parallel beams incident from the back surface side of the screen toward corresponding linear surface 44b at the center of lens portion 44. The parabolic surface forms its focal point on corresponding linear surface 44b (in this embodiment, a curved surface expressed by $y = 0.4 \times 2$). The upper end side of each total reflection surface 45 is formed into linear leading surface 45a which stands at an angle larger than that of total reflection surface 45. Leading surfaces 45a reflect parallel beams incident from the back surface side of the screen toward convex lens surfaces 44d at the two sides of lens portion 44. The height of each leading surface 45a, i.e., distance $\Delta h$ from the upper end of the parabolic surface portion of total reflection surface 45 to the top portion of lens unit 43 (the side edge of convex lens surface 44d) is about 0.215 mm. Leading angle $\theta a$ of leading surface 45a with respect to the screen surface is about 70 degrees.

Figure 15:
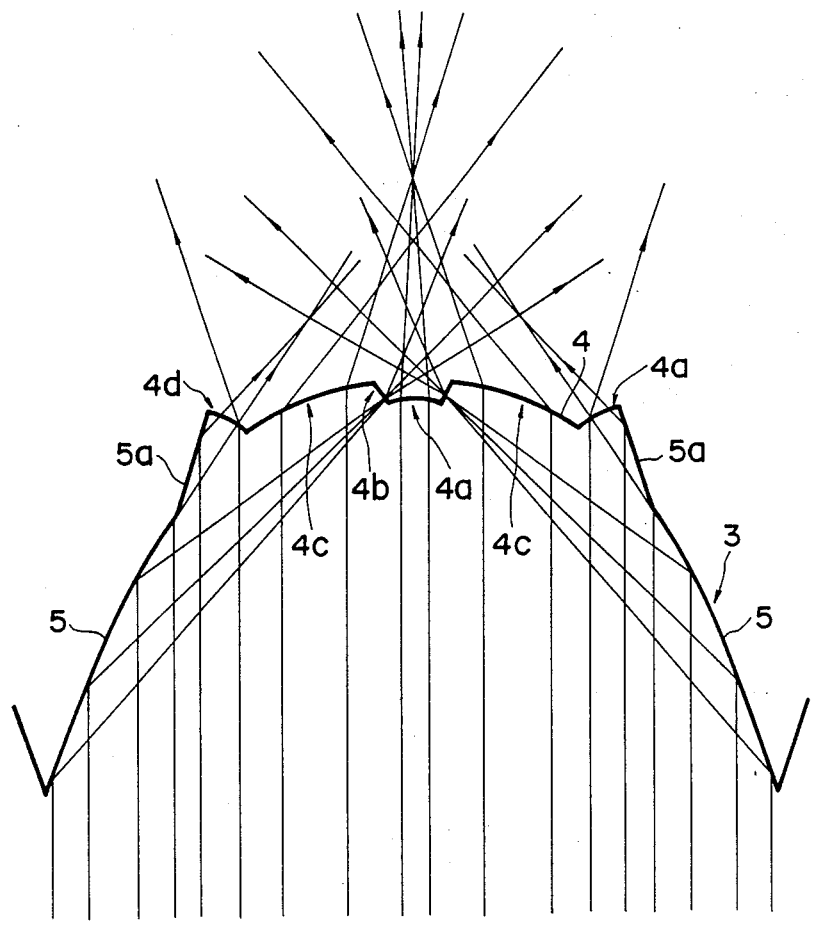
FIG. 15 is a view showing a light diffusing state of the single lens unit in FIG. 14.

FIG. 15 shows a light diffusing state of single lens unit 43 of lenticular lens 42. Of parallel beams incident on lens unit 43 from the back surface side of the screen, light components directly transmitted through lens portion 43 at the top portion of the lens unit are refracted and diffused by lens surfaces 44a, 44c, and 44d, as shown in FIG. 15. The parallel beams incident on parabolic total reflection surfaces 45 at the two sides of lens unit 43 are reflected and focused thereby toward linear surfaces 44b at the two sides of convex lens surfaces 44a formed on the center portion of lens portion 44. Then, the beams are transmitted through linear surfaces 44b and are then refracted and diffused, as shown in FIG. 15. The parallel beams incident on leading surfaces 45a at the upper ends of total reflection surfaces 45 are reflected thereby toward convex lens surfaces 44d formed on the two side edge portions of lens portion 44, and are transmitted through surfaces 44d to be refracted and diffused as shown in FIG. 15.

In the transmission type screen, total reflection surfaces 45 at the two sides of each lens unit 43 for diffusing light incident from the back surface side and exited toward the front surface have the parabolic surfaces as described above. Thus, all the light components reflected by total reflection surfaces 45 are focused onto linear surfaces 44b formed at the central portion of lens portion 44. Since linear surfaces 44b face corresponding total reflection surfaces 45, light reflected by total reflection surfaces 45 and incident on linear surfaces 44b are transmitted through surfaces 45 without being reflected thereby. According to the transmission type screen, light reflected by total reflection surfaces 45 of lens units 43 toward lens portion 44 can be transmitted toward the front surface side of the screen without loss, thereby providing a bright screen. In this embodiment, the reason why parabolic total reflection surfaces 45 are formed into curved surfaces forming focal points on linear surfaces 44b is to maximize a diffusion angle at linear surfaces 44b of light reflected by total reflection surfaces 45. Light incident on each linear surface 44b is reflected by this linear surface 44b toward corresponding aspherical lens surface 44c, and may be again reflected by aspherical lens surface 44c toward the back surface side of the screen in accordance with an incident angle to surface 44c. However, since the width (height) of each linear surface 44b is very small, light loss due to light reflection at linear surfaces 44b is very small. As compared to this light loss, the effect for allowing all the light components reflected by total reflection surfaces 45 to transmit through linear surfaces 44b toward the front surface side of the screen is remarkable. Therefore, the light loss caused by linear surfaces 44b can be ignored. In this embodiment, since convex lens surface 44a is formed between linear surfaces 44b, a decrease in brightness at the linear surface 44b portions due to reflection of incident parallel beams can be compensated for by light diffusion at convex lens surface 44a when the screen is viewed from its front side.

In this embodiment, since linear leading surfaces 45a which stand at an angle larger than that of total reflection surfaces 45 are formed at the upper end sides of total reflection surfaces 45 at the two sides of each lens unit 43 of lenticular lens 42, light reflected from a portion near the upper end of the total reflection surface toward a portion near the side edge portion of lens portion 44 cannot be incident from the total reflection angle direction on the lens surface of lens portion 44 to be reflected thereby in the screen back surface direction, unlike a case wherein the upper ends of total reflection surfaces 45 are directly coupled to lens portion 44. Therefore, light loss will not occur near the two side edge portions of lens portion 44. In this embodiment, portions between the central portion and the two side edge portions of lens portion 44 of each lens unit 43 of lenticular lens 42 are formed into aspherical lens surfaces 44c having a larger light diffusion angle than that of a spherical lens. Therefore, light can be diffused over a wide range at the screen surface, thereby increasing the field angle.

In the case of an enlarged image projection type projection apparatus, light emitted from a projection source is incident on the screen while being spread. In this case, a Fresnel lens for refracting light from the projection source to be parallel beams perpendicular to the screen surface is arranged at the back screen side of the screen, or the Fresnel lens is formed integrally on the back surface of the screen, so that light emitted from the projection source is incident on the screen through the Fresnel lens. In the case of an enlarged image projection type and oblique projection type apparatus, a Fresnel lens for converting diffused incident light into parallel beams and another Fresnel lens for converting a direction of light into a direction perpendicular to the screen surface are arranged on the back surface side of the screen (one Fresnel lens can be formed integrally on the back surface of the screen), so that the light emitted from the projection source is converted to parallel beams perpendicular to the screen surface to be incident thereon. This also applied to the following embodiment.

Figure 16:
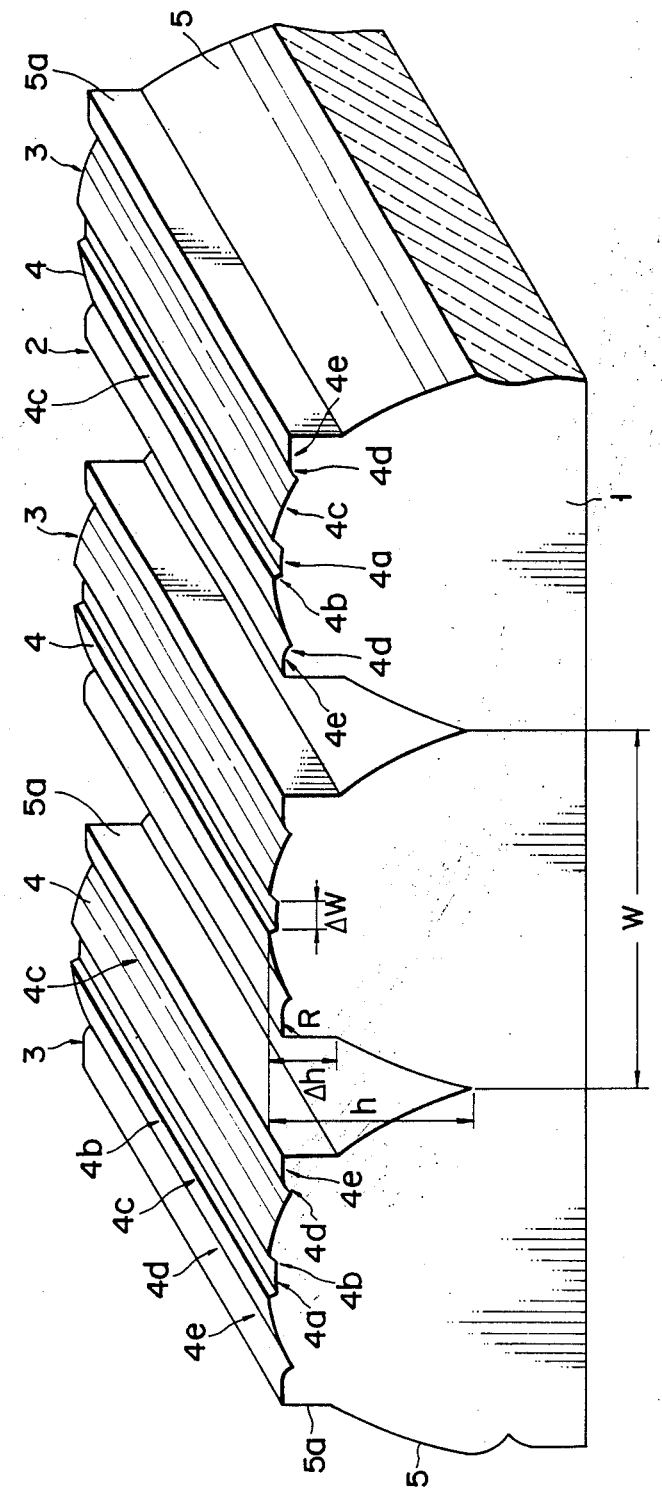
FIG. 16 is a perspective view showing a transmission type screen according to still another embodiment of the present invention.
Figure 17:
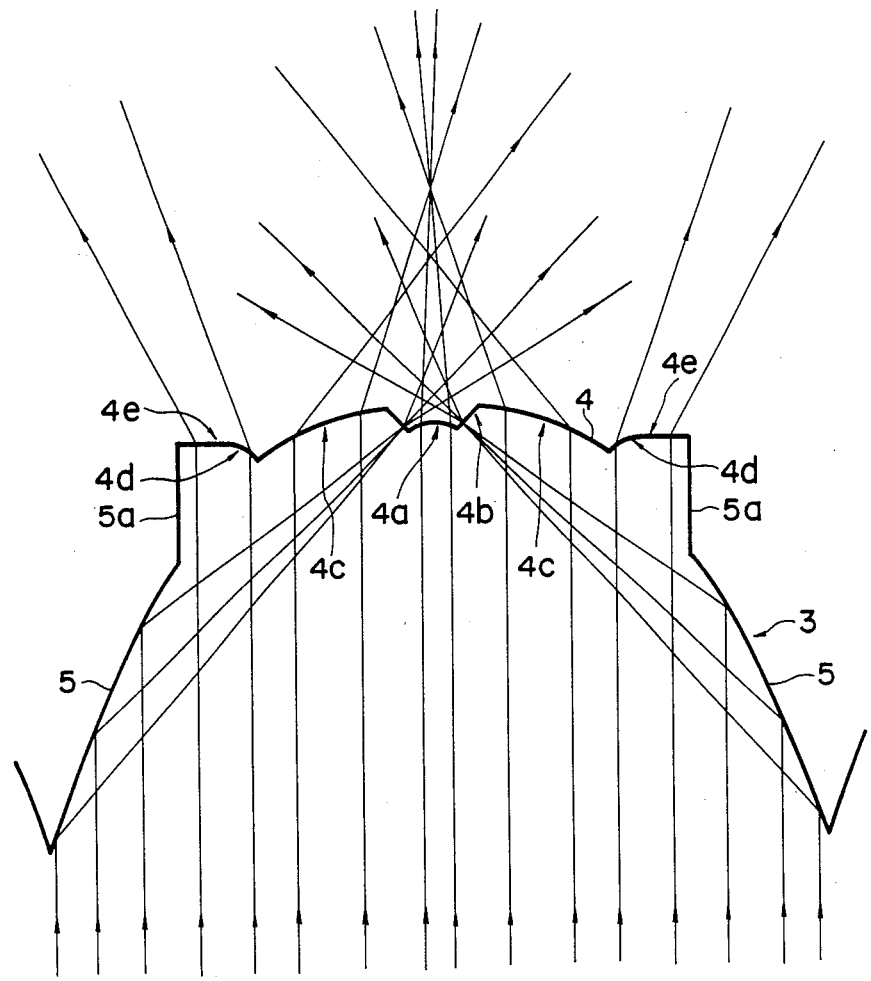
FIG. 17 is a view showing a light diffusing state of the single lens unit in FIG. 16.

FIGS. 16 and 17 show a modification of this embodiment. In this modification, each lens portion 44 of lens units 43 of lenticular lens 42 has a shape wherein convex lens surface 44a and linear surfaces 44b are formed at the central portion, convex lens-like aspherical lens surfaces 44c are formed at the two sides thereof, and convex lens surfaces 44d are formed at the two side edge portions in the same manner as in the above embodiment. Total reflection surfaces 45 at the two sides of each lens unit 43 are formed into parabolic surfaces for reflecting and focusing parallel beams incident from the back surface side of the screen toward linear surfaces 44b at the center of the lens portion. Linear leading surface 45a which stands at an angle larger than an inclination angle of total reflection surface 45 is formed at the upper end side of each total reflection surface 45. In this embodiment, leading surfaces 45a are vertical surfaces which stand substantially upright with respect to the screen body, and the outer edge sides of convex lens surfaces 44d at the two sides of the lens portion extend in a substantially horizontal direction to form horizontal surfaces 44e substantially perpendicular to leading surfaces 45a. Note that dimensions w, h, Δw, Δh, and R of each lens unit 43 are the same as those in the above embodiment.

In the transmission type screen of this modification, light incident from the back surface side and transmitted through the screen is diffused by lenticular lens 42 on the screen surface, as shown in FIG. 17. Light transmitted through lens surfaces 44a, 44c, and 44d of lens portion 44 of lens units 43 are refracted and diffused, as shown in FIG. 17. Light transmitted through horizontal surfaces 44e at the outer edge are refracted by a difference in refractive index between the material (e.g., an acrylic resin) of the screen and air. In this modification, light reflected by total reflection surfaces 45 of lens units 43 toward lens portion 44 can be transmitted toward the front surface side of the screen without loss, thereby providing a bright screen. Since the almost vertical leading surfaces 45a are formed at the upper end sides of total reflection surfaces 45 of lens units 43, light loss near the side edge portions of lens portion 44 can be eliminated. Note that leading surfaces 45a at the upper end sides of total reflection surfaces 45 cannot be perfectly vertical surfaces due to releasing in screen molding. Therefore, leading surfaces 45a are slightly inclined, and hence, parallel beams incident from the back surface side of the screen toward leading surfaces 45a are reflected by surfaces 45a and become incident near the side edge portions of lens portion 44. However, light reflected by leading surfaces 45a becomes incident on horizontal surfaces 44e at the two side edge portions of the lens portion and is transmitted therethrough. Therefore, light reflected by leading surfaces 45a and incident near the side edge portion of the lens portion cannot be reflected by the lens surface to cause light loss.

In the above modification, total reflection surfaces 45 at the two sides of lens units 43 of lenticular lens 2 have parabolic surfaces. However, each total reflection surface 45 can only have a surface capable of reflecting and focusing incident light from the screen back surface side toward linear surface 44b at the center of the lens portion, and may have an arcuated surface such as an elliptic surface. In the above modification, the screen is formed of a transparent resin such as an acrylic resin. The transmission type screen may be formed of a transparent resin in which light diffusion particles are mixed or of a transparent resin sheet having one entire surface with a light diffusion layer.

Therefore, the linear surface facing the total reflection surfaces at the two side of the lens unit is formed at the central portion of the lens portion of each lens unit of the lenticular lens for diffusing light incident from the back surface side and emerged toward the front surface side. In addition, the total reflection surface has an arcuated surface capable of reflecting and focusing the incident light from the screen back surface side toward the linear surface. Therefore, light reflected by the total reflection surface of each lens unit of the lenticular lens toward the lens portion can be transmitted toward the front screen surface side without loss, thus providing a bright screen.

What is claimed is:

1. A back-surface projection screen for observing a light image, projected from the rear surface of a screen, on a front surface side, which comprises a lenticular lens constructed of a great number of lens units in a continuous array with a top surface section defined as a lens section and with a total-reflection surface formed at each side of the lens section, in which, with respect to a central area of the lens section of each lens unit, linear surfaces are provided in an opposed relation at the total-reflection surfaces of each lens unit.

2. The back-surface projection screen according to claim 1, in which said total-reflection surfaces allow light which is incident on said screen from behind to be condensed by reflection toward said linear surfaces of the lens unit.

3. The back-surface projection screen according to claim 1, in which said total-reflection surfaces are so formed as to include an abrupt surface.

4. The back-surface projection screen according to claim 3, in which said abrupt surface is formed on an upper portion of said reflection surfaces.

5. A back-surface projection screen for observing a light image, projected from the rear surface of a screen, on a front surface side, which comprises a lenticular lens constructed of a great number of lens units in a continuous array with a top surface section defined as a lens section and with a total-reflection surface formed at each side of the lens section, in which the lens section of each lens unit in the lenticular lens is formed such that it is recessed to define a central convex lens surface with a side convex lens surface provided at each side of the central convex lens surface and a pair of stepped surfaces are formed each at a boundary between the central convex lens and the side convex lens surface to provide linear surfaces in an opposed relation with the central convex lens surface therebetween.

6. The back-surface projection screen according to claim 5, in which said total-reflection surfaces allow light which is incident on said screen from behind to be condensed by reflection toward said linear surfaces of the lens unit.

7. The back-surface projection screen according to claim 5, in which said central convex lens surface and said side convex surfaces of each of said lens units in the lenticular lens are a spherical surface and aspherical surfaces, respectively.

8. The back-surface projection screen according to claim 5, in which said total-reflection surfaces are parabolic surfaces.

9. A back-surface projection screen for observing a light image, projected from the rear surface of a screen, on a front surface side, which comprises a lenticular lens constructed of a great number of lens units in a continuous array with a top surface section defined as a lens section and with a total-reflection surface formed at each side of the lens section, in which the lens section of each lens unit in the lenticular lens is formed such that it is recessed to define a central convex lens surface with a side convex lens surface provided at each side of the central convex lens surface and a pair of stepped surfaces are formed each at a boundary between the central convex lens and the side convex lens surface to provide linear surfaces in an opposed relation with the central convex lens surface therebetween, and said total-reflection surfaces are curved surfaces which allow light which is incident on the screen from behind to be condensed by reflection toward said linear surfaces.

10. The back-surface projection screen according to claim 9, in which said central lens surface and said convex lens surfaces are spherical and said total-reflection surface is parabolic.

11. The back-surface projection screen according to claim 9, in which said central convex lens surface and said side convex surface are aspherical and said total-reflection surface is parabolic.

12. The back-surface projection screen according to claim 9, in which a Fresnel lens is formed integral with a back surface of the screen to allow light which is incident on the screen to be corrected as parallel light perpendicular to the screen surface.

13. A back-surface projection screen for observing a light image, projected from the rear surface of a screen, on a front surface side, which comprises a lenticular lens constructed of a great number of lens units in a continuous array with a top surface section defined as a lens section and with a total-reflection surface formed at each side of the lens section, in which, with respect to a central area of the lens section of each lens unit, linear surfaces are provided in an opposed relation at the total-reflection surfaces of each lens unit, and said total-reflection surfaces are curved surfaces which allow light which is incident on the screen from behind to be condensed by reflection toward said linear surfaces.

14. A back-surface projection screen for observing a light image, projected from the rear surface of a screen, on a front surface side, which comprises a lenticular lens constructed of a great number of lens units in a continuous array with a top surface section defined as a lens section and with a total-reflection surface formed at each side of the lens section, in which said total-reflection surface is so formed as to include an abrupt surface at an upper surface portion.

15. A back surface projection screen for observing a light image, projected from the rear surface of a screen, on a front surface side, which comprises a lenticular lens constructed of a great number of lens units in a continuous array with a top surface section defined as a lens section and with a total-reflection surface formed at each side of the lens section, in which each lens unit in the lenticular lens is formed such that an aspherical lens surface is formed at an area between a central lens section formed at the lens section and an outer side portion with a convex lens surface formed at the outer side portion, that a pair of linear surfaces are formed in an opposed relation with the central lens section therebetween, that the total-reflection surface of the respective lens unit is curved to allow light which is incident on the screen from behind to be condensed by reflection toward said linear surfaces, and that the total-reflection surface is so formed as to include an abrupt surface at the upper portion.

16. A back-surface projection screen for observing a light image, projected from the rear surface of a screen, on a front surface side, which comprises a lenticular lens constructed of a great number of lens units in a continuous array with a top surface section defined as a lens section and with a total-reflection surface formed at each side of the lens section, in which each lens unit in the lenticular lens is formed such that an aspherical lens surface is formed at an area between a central lens section formed at the lens section and an outer side portion with a convex lens surface formed at the outer side portion, that a pair of flattened surfaces are so formed as to substantially horizontally extend from the convex lens surface toward the outer side portion, that a pair of linear surfaces are formed, in an opposed relation, at the total-reflection surfaces with the central lens section located therebetween, that the total-reflection surfaces are formed as curved surfaces which allow light which is incident on the screen from behind to be condensed by reflection toward the linear surfaces, and that the total-reflection surface is so formed as to include a substantially vertical surface at the upper surface portion.

* * * * *